(12) United States Patent
Duquesne et al.

(10) Patent No.: US 10,039,236 B2
(45) Date of Patent: Aug. 7, 2018

(54) GRAIN CLEANING SYSTEM HAVING IMPROVED AIR FLOW AND ADDITIONAL FALL STEP TO IMPROVE GRAIN CLEANING PERFORMANCE

(71) Applicant: CNH Industrial America LLC, New Holland, PA (US)

(72) Inventors: Frank R. G. Duquesne, Zwevegem (BE); Stefaan Ballegeer, Beernem (BE); Bart Derynck, Aartrijke (BE)

(73) Assignee: CNH Industrial America LLC, New Holland, PA (US)

( * ) Notice: Subject to any disclaimer, the term of this patent is extended or adjusted under 35 U.S.C. 154(b) by 36 days.

(21) Appl. No.: 15/167,580

(22) Filed: May 27, 2016

(65) Prior Publication Data

US 2016/0345500 A1    Dec. 1, 2016

(30) Foreign Application Priority Data

May 29, 2015 (BE) .................................. 2015/0157

(51) Int. Cl.
*A01F 12/48* (2006.01)
*B07B 1/50* (2006.01)
*B08B 5/00* (2006.01)
*A01F 12/44* (2006.01)

(52) U.S. Cl.
CPC .......... *A01F 12/444* (2013.01); *A01F 12/446* (2013.01); *A01F 12/448* (2013.01)

(58) Field of Classification Search
CPC ...... A01F 12/444; A01F 12/446; A01F 12/44; A01F 12/442; A01F 41/1276
See application file for complete search history.

(56) References Cited

U.S. PATENT DOCUMENTS 3,664,349 A * 5/1972 Quick .................. A01F 12/444
                                                                209/136
4,353,376 A * 10/1982 Schuler ..................... A01F 7/06
                                                                460/67
4,531,528 A    7/1985 Peters et al.
(Continued)

FOREIGN PATENT DOCUMENTS

DE            3228326 A1    2/1984
DE       102005031053 A1    1/2007
(Continued)

OTHER PUBLICATIONS

European Search Report; 16171846.5; dated Oct. 11, 2016; 9 Pages.

*Primary Examiner* — Arpad Fabian-Kovacs
(74) *Attorney, Agent, or Firm* — Peter K. Zacharias

(57) ABSTRACT

An agricultural harvester including a chassis, a threshing and separating system for separating grain from MOG, and a grain cleaning system for further separating grain from residual MOG. The grain cleaning system has a main grain pan, an intermediate grain pan located beneath and rearward of the main grain pan, and at least one sieve located beneath and rearward of the intermediate grain pan. The main grain pan, the intermediate grain pan, and the at least one sieve are so arranged that the mixture of grain and residual MOG undergoes a first fall step from the main grain pan to the intermediate grain pan and a second fall step from the intermediate grain pan to the at least one sieve.

20 Claims, 5 Drawing Sheets

(56) References Cited

U.S. PATENT DOCUMENTS

| | | | | |
|---|---|---|---|---|
| 5,387,154 | A * | 2/1995 | Peters | A01F 12/444 |
| | | | | 460/100 |
| 5,624,315 | A * | 4/1997 | Jonckheere | A01F 12/444 |
| | | | | 460/100 |
| 6,773,343 | B2 * | 8/2004 | Grywacheski | A01F 12/444 |
| | | | | 460/100 |
| 7,413,507 | B2 | 8/2008 | Weichholdt | |
| 7,566,266 | B1 * | 7/2009 | Ricketts | A01F 11/06 |
| | | | | 460/101 |
| 8,221,064 | B2 * | 7/2012 | Ricketts | F04D 17/04 |
| | | | | 415/184 |
| 9,033,779 | B2 | 5/2015 | Hillen et al. | |
| 9,462,752 | B2 * | 10/2016 | Farley | A01F 12/446 |
| 9,686,918 | B2 * | 6/2017 | Weeks | A01F 12/46 |
| 2006/0281506 | A1 * | 12/2006 | Weichholdt | A01F 12/446 |
| | | | | 460/101 |
| 2009/0264169 | A1 * | 10/2009 | Ricketts | A01F 12/446 |
| | | | | 460/101 |
| 2009/0280876 | A1 * | 11/2009 | Yoder | A01F 12/444 |
| | | | | 460/100 |
| 2010/0144412 | A1 * | 6/2010 | Schwinn | A01F 12/446 |
| | | | | 460/99 |
| 2014/0066145 | A1 | 3/2014 | Bilde | |
| 2014/0200057 | A1 | 7/2014 | Farley et al. | |
| 2017/0099777 | A1 * | 4/2017 | Weeks | A01D 41/1243 |

FOREIGN PATENT DOCUMENTS

| | | | | |
|---|---|---|---|---|
| EP | 2591661 A1 * | 5/2013 | | A01D 75/282 |
| EP | 2612548 A1 * | 7/2013 | | A01D 75/282 |
| FR | 2638603 A1 | 5/1990 | | |
| WO | WO-2013028748 A1 * | 2/2013 | | A01F 12/446 |

\* cited by examiner

GRAIN CLEANING SYSTEM HAVING IMPROVED AIR FLOW AND ADDITIONAL FALL STEP TO IMPROVE GRAIN CLEANING PERFORMANCE

CROSS REFERENCE TO RELATED APPLICATION

This application claims priority to Belgium Application No. 2015/0157, filed May 29, 2015, the contents of which are incorporated herein by reference.

FIELD OF THE INVENTION

The present invention relates to agricultural harvesters, and, more particularly, to the grain cleaning system portion following the threshing and separating system of agricultural harvesters.

BACKGROUND OF THE INVENTION

Combines are used to harvest agricultural crops such as corn, soybeans, wheat and other grain crops. As the combine is driven through crop fields, the combine cuts the crop, separates the desired crop from the undesired waste, stores the crop, and discards the waste.

In a typical combine, a header is mounted to the front of the combine to gather the crop and feed the crop into the combine for processing. As the combine is driven through the field, the crop material is collected by the header and deposited into a feeder housing. The crop material is then transported upwardly and into the combine by a feed elevator located within the feeder housing. The crop material then passes through a threshing and separating mechanism. In a rotary combine, the threshing and separating mechanism includes a rotor, a threshing concave, a rotor cage, and a separating grate. As crop material passes between the rotor, the threshing concave and the separating grate, the crop material is impacted and/or rubbed, thereby causing the grain to separate from the stalk material. The stalk material that is separated from the grain is commonly referred to as material other than grain (MOG). Other types of combines are also known that perform similar functions using different mechanisms.

After passing through the threshing and separating assembly, the grain and MOG are deposited onto a grain cleaning system. The grain cleaning system of a typical combine includes a plurality of adjustable cleaning sieves, often referred to as a chaffer sieve and a shoe sieve, and sometimes a pre-cleaning sieve. These sieves are typically reciprocated back and forth in opposite directions along an arcuate path. This motion has the tendency to separate the grain from the MOG. To further separate the grain from the MOG, a cleaning fan or blower is positioned so as to blow air up through the cleaning sieves. This flow of air tends to blow the MOG, which is typically lighter than grain, rearwardly and out the back of the combine. Grain, which is heavier than MOG, is allowed to drop through the openings in the sieve.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The auger trough is typically positioned near the forward end of the cleaning sieves and extends along the width of the sieves. The grain collected in the auger trough is then moved by an auger towards the side of the combine where it is raised by a grain elevator and deposited into a storage tank or grain tank. Other systems also exist that can utilize, for example, a loop conveyor system which eliminates the need for a conventional cross auger.

The efficiency and effectiveness of the grain cleaning system is strongly dependent upon the proper suspension of the mixture of grain and residual MOG in moving air provided by the cleaning fan as the mixture moves over the sieves. Failure to properly suspend this mixture in moving air as it moves through the cleaning system results in material layer collapse. This inhibits the efficiency of the sieves and causes loss of valuable grain, which passes out of the rear of the agricultural harvester along with the residual MOG.

What is needed in the art is a way to provide improved suspension of the mixture of grain and residual MOG in air as the mixture passes through the cleaning system.

SUMMARY OF THE INVENTION

In accordance with an aspect of the present invention, there is provided a way to provide improved suspension of the mixture of grain and residual MOG in moving air as the mixture passes through the cleaning system and over the sieves.

In accordance with another aspect of the present invention, there is provided an agricultural harvester having a chassis, a threshing and separating system for separating grain from MOG, and a grain cleaning system for further separating grain from residual MOG. The grain cleaning system has at least two grain pans for receiving a mixture of grain and residual MOG form the threshing and separating system. At least one sieve is provided for further separating grain, tailings, and residual MOG, which is located beneath and rearward of the at least two grain pans. A grain transfer pan is located beneath the at least one grain pan. The at least two grain pans and the at least one sieve are so arranged that the mixture of grain and residual MOG undergoes at least two fall steps. A cleaning fan blows air into and through the mixture of grain and residual MOG as it undergoes the at least two fall steps and as it moves over the at least one sieve. A fan wrapper wraps around the cleaning fan and terminates in a wrapper cut-off point, and a fan outlet air guide guides air coming from the cleaning fan and terminates in a vortex cut-off point. The fan wrapper and the fan outlet guide together define a fan main outlet leading to at least one additional fan outlet. The wrapper cut-off point and the vortex cut-off point together define a fan inlet, and are located at angles $\alpha$ and $\beta$, respectively, from a vertical centerline through the center of the cleaning fan. The angle $\alpha$ is between 40° and 70°, preferably between 50° and 60°, especially preferably about 55°, and the angle $\beta$ is between 30° and 60°, preferably between 40° and 50°, especially preferably about 45°.

An advantage of the agricultural harvester according to aspects of the invention herein and particularly the grain cleaning system thereof is that it improves suspension of the mixture of grain and residual MOG in moving air as the mixture passes through the cleaning system while utilizing a single cleaning fan, such that an additional cleaning fan, which may be subject to variations in back-pressure, is not required. In this way, material collapse of the mixture of grain and residual MOG is avoided without adding significant expense.

Another advantage is that the grain cleaning system may be adjustable in many respects, including the proportionate length of the first fall step to the second fall step, the relative proportion of air moving through the mixture of grain and residual MOG during the first and second fall steps, and the phase and magnitude relationship between the reciprocal motion of the main grain pan, the intermediate grain pan, and the sieves. In this way, the agricultural harvester may be tuned to the cleaning needs of various harvested agricultural products.

Another advantage is that, by optimizing the angular locations of the wrapper cut-off point and the vortex cut-off point relative to the vertical centerline of the cleaning fan, unexpectedly improved airflow from the cleaning fan results. This allows for sufficient airflow through the first and second fall steps and through the sieves to provide for improved suspension of the mixture of grain and residual MOG.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
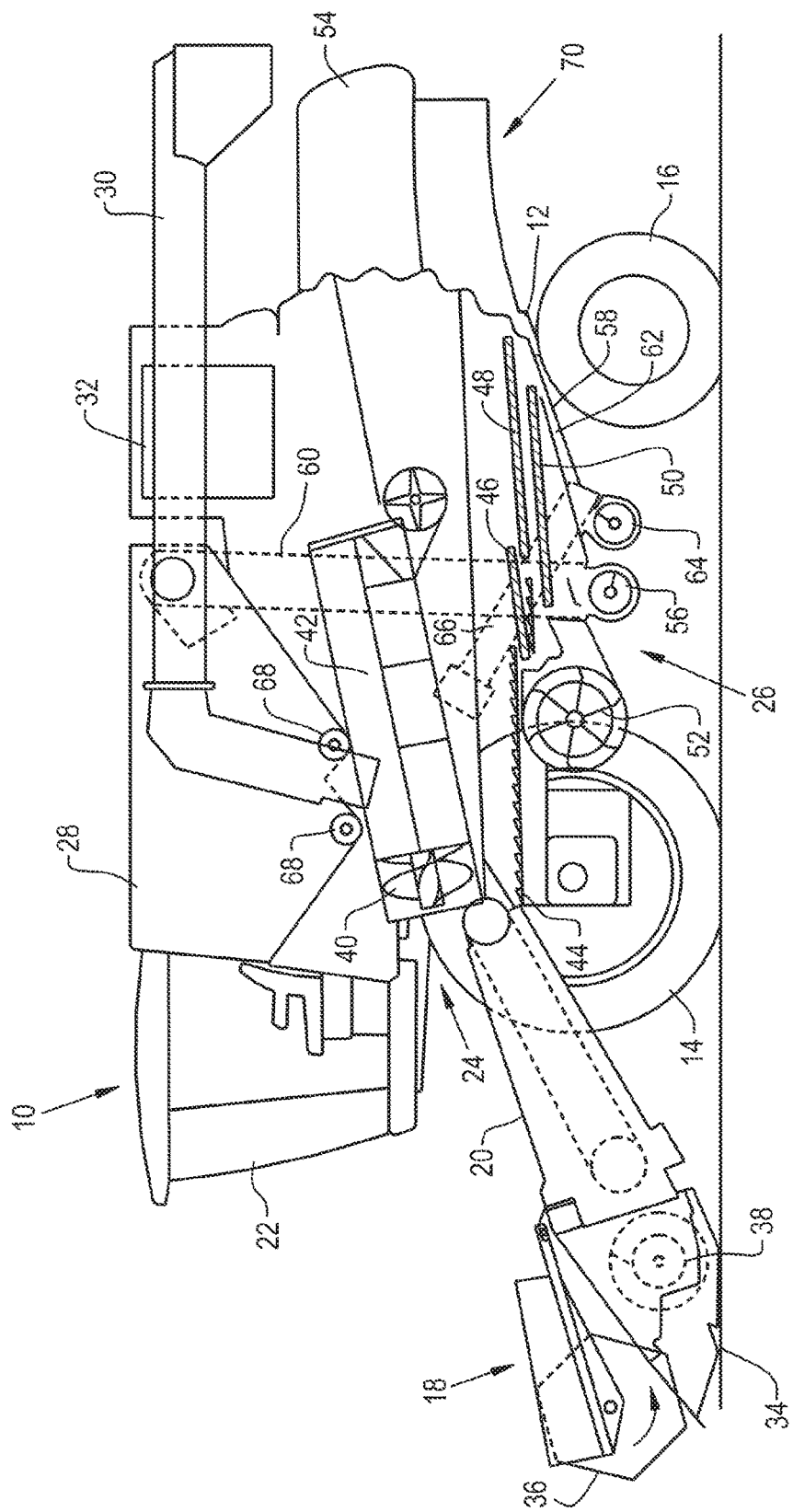
FIG. 1 is a side view of an embodiment of an agricultural harvester, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a grain cleaning system 26, a grain tank 28, and an unloading auger 30, in accordance with an exemplary embodiment of the present invention. It should be appreciated that while the agricultural harvester is shown as combine 10, the agricultural harvester can be any type of construction that allows for crop material to be harvested such as a conventional combine (which does not have a rotor), rotary combine, hybrid combine, chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or halftracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain which has been separated by the rotor 40 and perforated concaves 42 falls onto a main grain pan 44 and is conveyed toward grain cleaning system 26. The grain cleaning system 26 may include an optional pre-cleaning sieve 46, an upper sieve 48 (also known as a chaffer sieve), a lower sieve 50 (also known as a shoe sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from straw hood 54 of the combine 10. The main grain pan 44 and the pre-cleaning sieve 46 oscillate or reciprocate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from a bottom pan 58 of the grain cleaning system 26. The clean grain auger 56 conveys the clean grain laterally to a generally vertically arranged elevator 60, which can also be referred to as a grain elevator, for transport to the grain tank 28. Tailings from the grain cleaning system 26 fall to a tailings auger on 62. The tailings are transported via a tailings auger 64 and a return auger 66 to the upstream end of the grain cleaning system 26 for repeated cleaning action. A pair of grain tank augers 68 at the bottom of the grain tank 28 convey the clean grain laterally within the grain tank 28 to the unloading auger 30 for discharge from combine 10. The non-grain crop material proceeds through a residue handling system 70. The residue handling system 70 may include a chopper, counter knives, a windrow door and a residue spreader.

Figure 2:
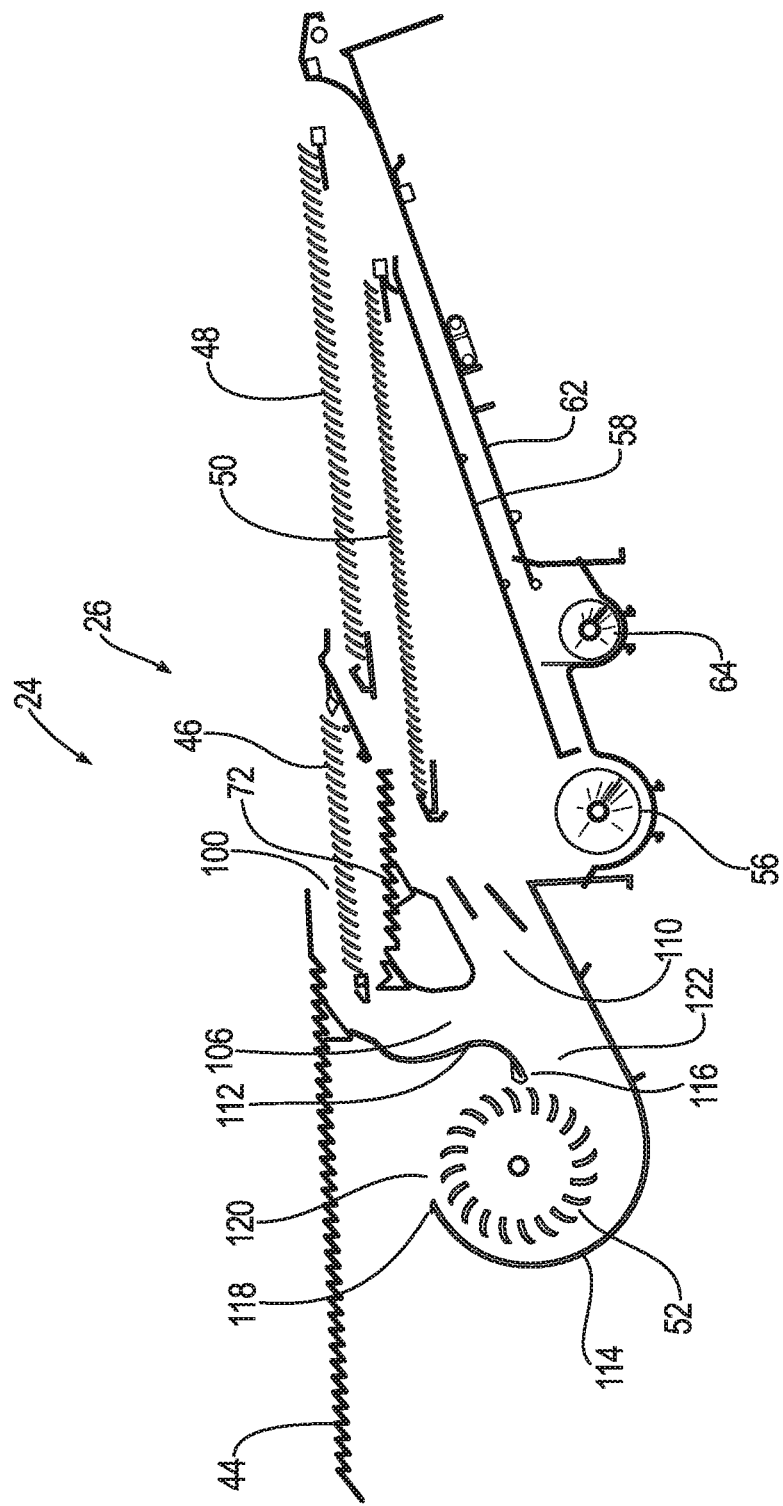
FIG. 2 is a cross-sectional view of a conventional grain cleaning system.

Referring now to FIG. 2, a conventional grain cleaning system 26, part of the threshing and separating system 24, is shown in cross-section. Prior to the grain cleaning system 26, the rotor 40 and perforated concave 42 (not shown in FIG. 2) operates to create a mat of the crop material and pass it through a narrow gap between the rotor 40 and the perforated concave 42 to thresh or separate the grains from the larger elements of MOG such as stems, stalks, leaves, pods, and plant fragments, such that a flow of the grain will be discharged into the grain cleaning system 26. This flow of grain will include some smaller elements of MOG, and falls on the main grain pan 44. A reciprocating motion causes the mixture of grain and residual MOG to move rearwardly until it passes over a fall step 100. The mixture then falls on the pre-cleaning sieve 46, where a certain volume of the mixture of grain and residual MOG are separated, again under reciprocal motion of the pre-cleaning sieve. Excess volume of the mixture of grain and residual MOG passes over the pre-cleaning sieve 46 onto the upper or chaffer sieve 48. The grain cleaned by pre-cleaning sieve 46 and upper sieve 48 then falls through to lower or shoe sieve 50 for further cleaning, also under reciprocal motion. Because the pre-cleaning sieve 46 does not line up perfectly vertically with lower sieve 50, a grain transfer pan 72 reciprocally moves the partially cleaned grain rearwardly to fall onto the lower sieve 50.

Throughout this movement of the mixture of grain and residual MOG, a cleaning fan 52 blows air up past the ends of the main grain pan 44 and the grain transfer pan 72, and up through the pre-cleaning sieve 46, the upper sieve 48, and the lower sieve 50, by way of fan main outlet 122 leading to a fan upper outlet 106 and a fan lower outlet 110, guided by fan outlet air guide 112. Air enters the cleaning fan 52 at a fan inlet 120 and is accelerated radially and tangentially, further guided by a fan wrapper 114. The fan inlet 120 is partly defined by the terminus of fan wrapper 114, which is referred to as a wrapper cut-off point 118, and by the terminus of the fan outlet air guide 112, which is referred to as a vortex cut-off point 116. In this way, the mixture of grain and residual MOG is suspended and separated as it passes through the grain cleaning system 26. Some MOG is blown rearward toward the residue handling system 70 (not shown) as it passes over the fall step 100. Clean grain falls through the pre-cleaning sieve 46, upper sieve 48, and lower sieve 50 onto the bottom pan 58 and descends into the clean grain auger 56, while additional MOG separated by the pre-cleaning sieve 46, the upper sieve 48, and the lower sieve 50 again blows rearward towards the residue handling system 70. Some grain and residual MOG that is difficult to separate passes over the pre-cleaning sieve 46, the upper sieve 48, and the lower sieve 50 and falls onto the tailings auger trough 62. These difficult-to-separate portions, called tailings, then descend into the tailings auger 64, where they are sent back through the threshing and separating system 24 by the return auger 66 (not shown).

If the grain cleaning system 26 becomes overwhelmed by the volume of the mixture of grain and residual MOG, the mixture fails to become suspended in the moving air at the fall step 100, and lands on the pre-cleaning sieve 46 in a collapsed layer of material. The pre-cleaning sieve 46, the upper sieve 48, and the lower sieve 50 then fail to separate the grain, tailings, and MOG as they are designed to do, and the mass of unseparated material moves together to the residue handling system 70, with the resultant loss of valuable grain, or falls together into the tailings auger 64 leading to inefficient recycling of both tailings and excess MOG. Effective suspension of the mixture of grain and residual MOG in the moving air is strongly affected by the initial fall step 100, as the mixture falls into the blast of air at the end of the main grain pan 44 before landing on the pre-cleaning sieve 46.

Figure 3:
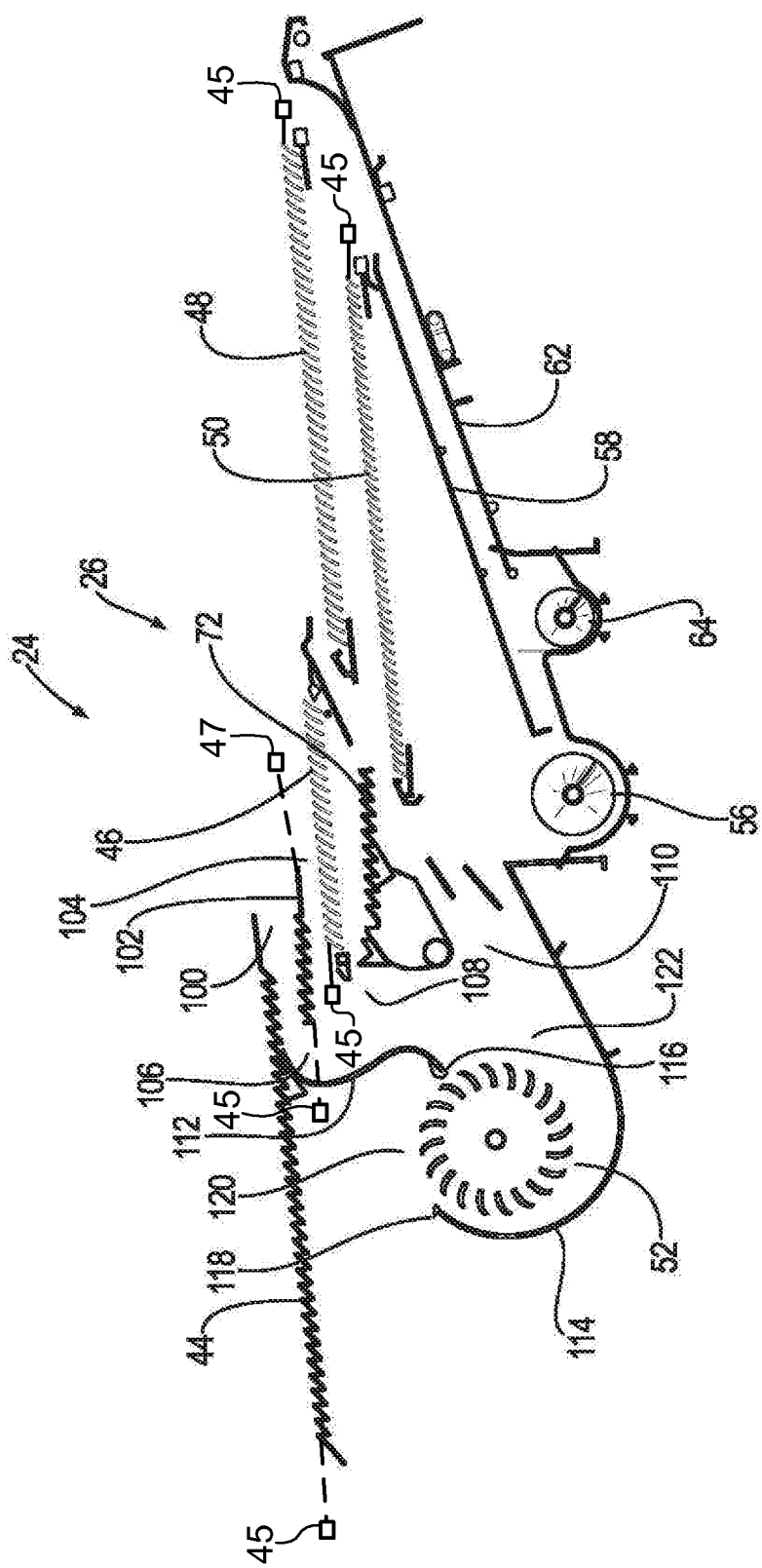
FIG. 3 is a cross-sectional view of a grain cleaning system, in accordance with an exemplary embodiment of the present invention.

Referring now to FIG. 3, an embodiment of the present invention is shown in cross-section, being a grain cleaning system 26, itself part of a threshing and separating system 24. The grain cleaning system 26 is again provided with a main grain pan 44 for receiving a flow of grain and residual MOG from a rotor 40 and perforated concaves 42 (not shown) of the threshing and separating system 24. The mixture of grain and residual MOG again moves rearwardly under the reciprocal motion of the main grain pan 44 through an actuator 45, illustrated schematically until it passes onto the pre-cleaning sieve 46, with excess mixture moving onto the upper or chaffer sieve 48. The grain cleaned by the pre-cleaning sieve 46 and the upper sieve 48 under reciprocal motion by actuators 45 then falls through to the lower or shoe sieve 50 for further cleaning, also under reciprocal motion by actuator 45. Because the pre-cleaning sieve 46 does not line up perfectly vertically with the lower sieve 50, a grain transfer pan 72 again reciprocally moves the partially cleaned grain rearwardly to fall onto the lower sieve 50. Actuators 45 may be one of a number of actuators for this purpose, known in the agricultural field.

A cleaning fan 52 again blows air up past the ends of the main grain pan 44 and the grain transfer pan 72, and up through the pre-cleaning sieve 46, the upper sieve 48, and the lower sieve 50. Clean grain falls through the pre-cleaning sieve 46, the upper sieve 48, and the lower sieve 50 onto the bottom pan 58 and descends into the clean grain auger 56, while additional MOG separated by the pre-cleaning sieve 46, the upper sieve 48, and the lower sieve 50 again blows rearward towards the residue handling system 70 (not shown). Grain and residual MOG that is difficult to separate again passes over the pre-cleaning sieve 46, the upper sieve 48, and the lower sieve 50 and falls onto the tailings auger trough 62 and descends into the tailings auger 64, where they are sent back through the threshing and separating system 24 by the return auger 66 (not shown).

The embodiment of FIG. 3 differs from the conventional grain cleaning system of FIG. 2 in that an additional fall step has been added to improve suspension of the mixture of grain and residual MOG in moving air as it moves through the grain cleaning system 26 in FIG. 3. Specifically, following the fall step 100, an additional intermediate grain pan 102 has been added, such that the mixture of grain and residual MOG undergoes a second fall step 104. This intermediate grain pan 102 may be located beneath and to the rearward of the main grain pan 44, and may be so located that the vertical distance from the main grain pan 44 to the intermediate grain pan 102 may be greater than, lesser than, or approximately equal to the distance from the intermediate grain pan 102 to the pre-cleaning sieve 46 and the upper sieve 48. Thus, the fall step 100 may be greater than, lesser than, or approximately equal to the second fall step 104. The intermediate grain pan 102 may also be at a greater angle from the horizontal from front to rear than the angle of the main grain pan 44 from the horizontal from front to rear, or the intermediate grain pan 102 may be at a lesser angle from the horizontal from front to rear than the angle of the main grain pan 44 from the horizontal from front to rear, or the intermediate grain pan 102 may be at an approximately equal angle from the horizontal from front to rear than the angle of the main grain pan 44 from the horizontal from front to rear.

In addition to the fan upper outlet 106 and the fan lower outlet 110, a fan middle outlet 108 beneath the intermediate grain pan 102 and above the grain transfer pan 72 provides the additional blast of moving air necessary to cause the second fall step 104 to improve the suspension of the mixture of grain and residual MOG in moving air that is needed for pre- the cleaning sieve 46, the upper sieve 48, and the lower sieve 50 to function effectively. The fan outlet air guide 112 again helps proportion moving air from the cleaning fan 52 by way of fan main outlet 122 leading to the fan upper outlet 106, the fan middle outlet 108, and the fan lower outlet 110. Air again enters the cleaning fan 52 at the fan inlet 120' and is accelerated radially and tangentially, further guided by the fan wrapper 114. The fan inlet 120' is again partly defined by a wrapper cut-off point 118' and by a vortex cut-off point 116'. The fan upper outlet 106 may have a greater area resulting in greater airflow than the fan middle outlet 108, or the fan upper outlet 106 may have a lesser area resulting in lesser airflow than the fan middle outlet 108, or the fan upper outlet 106 may have approximately equal area resulting in approximately equal airflow than the fan middle outlet 108.

Separation and suspension of the mixture of grain and residual MOG, as stated previously, is strongly affected by these initial fall steps and the movement of air therethrough. This is due to a number of factors, including the weight, density, cross-sectional area, and inertia of the various particles of grain and residual MOG, given that this mixture does not simply fall from the ends of the main grain pan 44 and the intermediate grain pan 102, but is tossed over by the reciprocating motion of these components. The effectiveness of the intermediate grain pan 102 and the second fall step 104 in further separating and suspending this mixture is enhanced by the fact that the mixture is already in dynamic and energetic motion when it contacts the intermediate grain pan 102, such that it enters the second fall step 104 further separated and with additional energy.

In order to enhance this effect, the intermediate grain pan 102 may move in reciprocal synchrony and in phase with the main grain pan 44, vertically or horizontally, or both vertically and horizontally, such that the intermediate grain pan 102 and the main grain pan 44 rise and fall together and move fore and aft together. Alternately, the intermediate grain pan 102 may move in synchrony and out of phase with the main grain pan 44, vertically or horizontally, or both vertically and horizontally, such that the intermediate grain pan 102 rises when the main grain pan 44 falls and moves fore and aft when the main grain pan 44 aft and fore, and vice versa. Alternately, the intermediate grain pan 102 and the main grain pan 44 may reciprocate entirely non-synchronously, so that the intermediate grain pan 102 reciprocates at a greater or lesser rate than the main grain pan 44. Further, the proportion of air moving through the mixture of grain and residual MOG at the fall step 100 and the second fall step 104 may be proportionately greater at the fall step 100, or may be proportionally greater at the second fall step 104, or may be about proportionally equal at the fall step 100 and the second fall step 104.

It is established in the art that not all harvested agricultural products are identical, and require different settings for the motion and adjustable geometry where applicable of the rotor 40, perforated concave 42, main grain pan 44, pre-cleaning sieve 46, upper sieve 48, lower sieve 50, and air movement from cleaning fan 52. In the present invention, the synchrony and phase of the motion of the main grain pan 44 and the intermediate grain pan 102 may also be adjustable by an operator in response to the type of agricultural product being harvested. Further, the relative fore and aft location and relative vertical location of the intermediate grain pan may be adjustable by actuator 47, illustrated schematically. Also, the proportion of air passing through the fan upper outlet 106 and the fan middle outlet 108 may also be adjustable.

Figure 4:
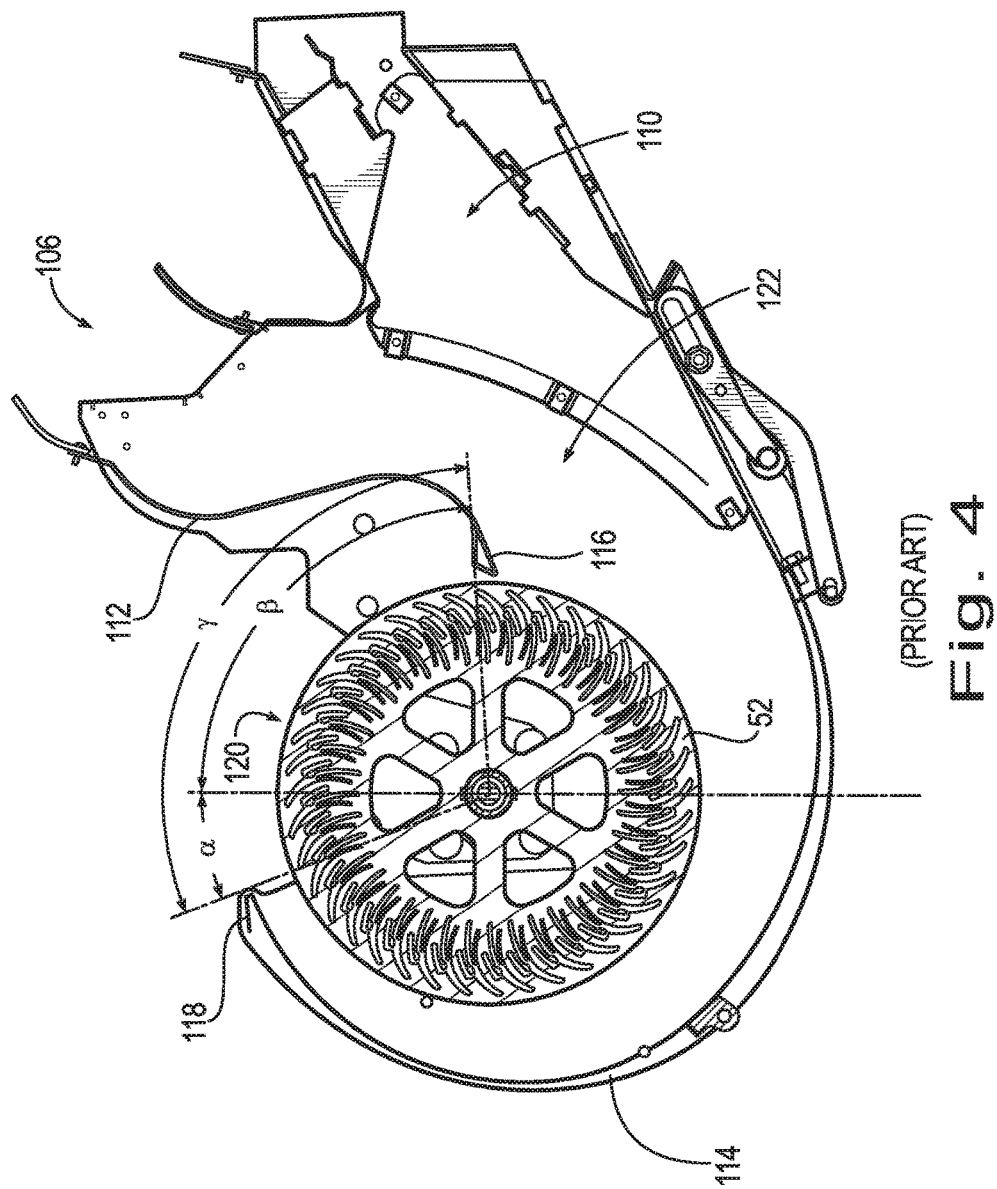
FIG. 4 is a cross-sectional view of a cleaning fan and air guide of a conventional grain cleaning system.

Turning now to FIG. 4, a sectional view is provided of the conventional cleaning fan 52, fan wrapper 114, and fan outlet air guide 112 arrangement. The fan wrapper 114 again terminates at the wrapper cut-off point 118 and the fan outlet air guide 112 again terminates at the vortex cut-off point 116. The wrapper cut-off point 118 and the vortex cut-off point 116 together partly define the fan inlet 120. Air exits cleaning the fan 52 at the fan main outlet 122, which leads to the fan upper outlet 106 and the fan lower outlet 110. Angle α describes the angle from the vertical centerline of the cleaning fan 52 to the wrapper cut-off point 118 in the counterclockwise direction. Angle β describes the angle from the vertical centerline of the cleaning fan 52 to the vortex cut-off point 116 in the clockwise direction. Angle γ represents the sum of angle α and angle β. Angle α in prior art embodiments are known to be about 20°. Angle β in prior art embodiments are known to be about 85°.

Figure 5:
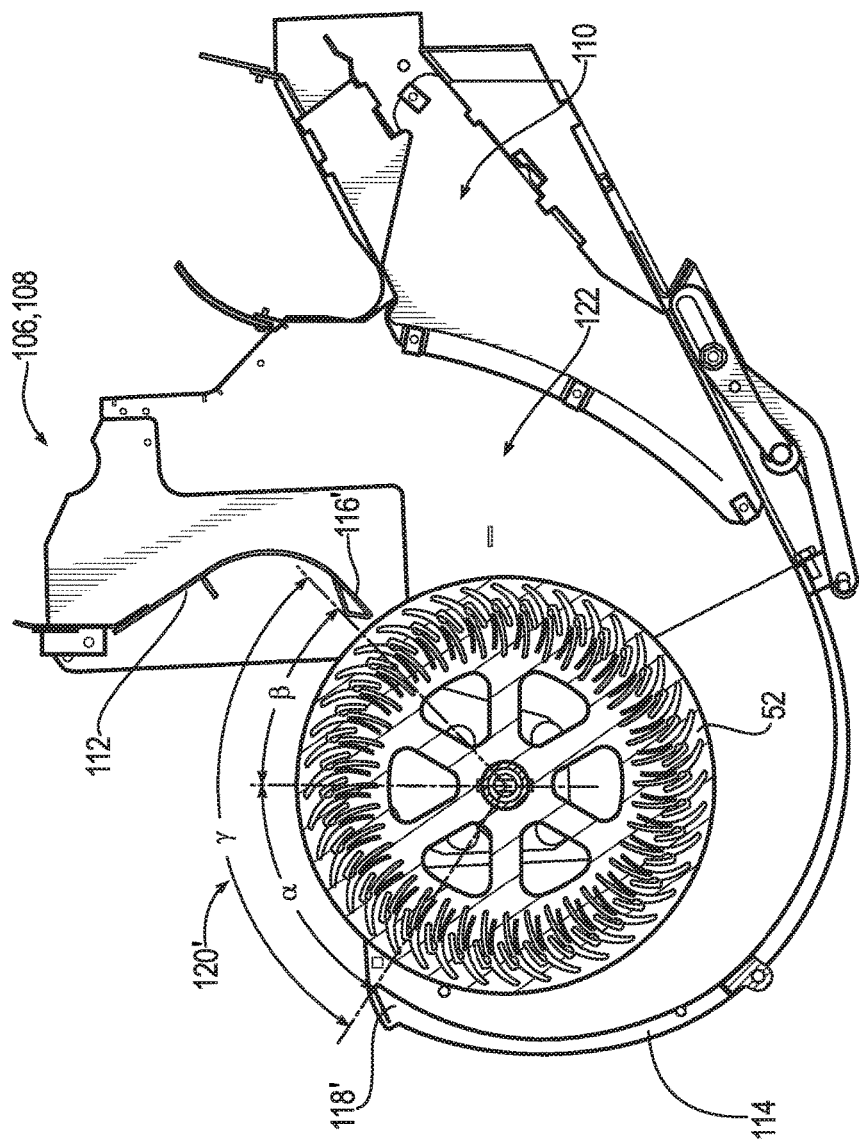
FIG. 5 is a cross-sectional view of a cleaning fan and air guide of a grain cleaning system, in accordance with an exemplary embodiment of the present invention.

Turning now to FIG. 5, a sectional view is provided of the cleaning fan 52, the fan wrapper 114, and the fan outlet air guide 112 arrangement, in accordance with an exemplary embodiment of the present invention. The fan wrapper 114 again terminates at the wrapper cut-off point 118' and the fan outlet air guide 112 again terminates at the vortex cut-off point 116'. The wrapper cut-off point 118' and the vortex cut-off point 116' again together partly define the fan inlet 120'. Air again exits the cleaning fan 52 at the fan main outlet 122, which now leads to fan the upper outlet 106, the fan middle outlet 108, and the fan lower outlet 110. Angle α again describes the angle from the vertical centerline of cleaning fan 52 to the wrapper cut-off point 118' in the counterclockwise direction. Angle β again describes the angle from the vertical centerline of cleaning fan 52 to the vortex cut-off point 116' in the clockwise direction. Angle again γ represents the sum of angle α and angle β.

In order to support the additional amount of air required to support the fan upper outlet 106, the fan middle outlet 108, and the fan lower outlet 110 without requiring an additional cleaning fan, which may be subject to variations in back-pressure, angle α and angle β have been optimized to produce unexpected improvement in the performance of the cleaning fan 52. A preferable range of values for angle α is 40° to 70°. An especially preferable range of values for angle α is 50° to 60°. A particularly preferable value for angle α is about 55°. A preferable range of values for angle β is 30° to 60°. An especially preferable range of values for angle β is 40° to 50°. A particularly preferable value for angle β is about 45°. Improving the performance of the cleaning fan 52 in this way, by way of optimizing the angular location of the wrapper cut-off point 118' and the vortex cut-off point 116', again provides the increased amount of air needed to support the additional air outlet.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural harvester, comprising:
   a chassis;
   a threshing and separating system for separating grain from MOG; and
   a grain cleaning system for further separating grain from residual MOG, the grain cleaning system comprising:
      at least two grain pans for receiving a mixture of grain and residual MOG from the threshing and separating system;
      at least one sieve for further separating grain, tailings, and residual MOG located beneath and rearward of the at least two grain pans, the at least two grain pans and the at least one sieve being so arranged that, when in use, the mixture of grain and residual MOG undergoes at least two fall steps;
      a grain transfer pan located beneath the at least two grain pans; and
      a cleaning fan configured for blowing air into and through the mixture of grain and residual MOG as it undergoes the at least two fall steps and as it moves over the at least one sieve, the cleaning fan comprising a fan wrapper terminating in a wrapper cut-off point, the cleaning fan further comprising a fan outlet air guide terminating in a vortex cut-off point, the fan wrapper and the fan outlet air guide together defining a fan main outlet leading to at least one additional fan outlet, the wrapper cut-off point and the vortex cut-off point together defining a fan inlet, the wrapper cut-off point being located at an angle α counterclockwise from a vertical centerline through a center of the cleaning fan, the vortex cut-off point being located at an angle β clockwise from the vertical centerline through the center of the cleaning fan, the angle α being between 40° and 70°, and the angle β being between 30° and 60°.

2. The agricultural harvester of claim 1, wherein the angle α is between 50° and 60° and the angle β is between 40° and 50°.

3. The agricultural harvester of claim 2, wherein the angle α is about 55° and the angle β is about 45°.

4. The agricultural harvester of claim 1, wherein:
   the at least two grain pans further comprise a main grain pan for receiving the mixture of grain and residual MOG from the threshing and separating system, and an intermediate grain pan located beneath and rearward of the main grain pan, and
   the main grain pan, the intermediate grain pan, and the at least one sieve are so arranged that, when in use, the mixture of grain and residual MOG undergoes a first fall step from the main grain pan to the intermediate grain pan, and then undergoes a second fall step from the intermediate grain pan to the at least one sieve.

5. The agricultural harvester of claim 4, wherein the at least one additional fan outlet further comprises:
   a fan upper outlet located between the main grain pan and the intermediate grain pan in the area of the first fall step;
   a fan middle outlet located between the intermediate grain pan and the at least one sieve in the area of the second fall step; and
   a fan lower outlet located beneath the grain transfer pan.

6. The agricultural harvester of claim 5, wherein a vertical distance between the main grain pan and the intermediate grain pan is one of proportionately greater than, proportionately lesser than, and proportionately approximately equal to a vertical distance between the intermediate grain pan and the at least one sieve, such that the first fall step is one of proportionately greater than, proportionately lesser than, and proportionately approximately equal to the second fall step, respectively, and such that the fan upper outlet has one of proportionately greater area resulting in proportionately greater airflow, proportionately lesser area resulting in proportionately lesser airflow, and proportionately approximately equal area resulting in proportionately approximately equal airflow than the fan middle outlet, respectively.

7. The agricultural harvester of claim 4, wherein the intermediate grain pan is one of at a greater angle from the horizontal from front to rear than the angle of the main grain pan from the horizontal from front to rear, at a lesser angle from the horizontal from front to rear than the angle of the main grain pan from the horizontal from front to rear, and at an approximately equal angle from the horizontal from front to rear than the angle of the main grain pan from the horizontal from front to rear.

8. The agricultural harvester of claim 4, wherein the intermediate grain pan is adjustable in its vertical location by an operator, such that a proportion between the first fall step and the second fall step may be adjusted to accommodate properties of differing harvested products.

9. The agricultural harvester of claim 8, wherein the adjustability of the intermediate grain pan comprises a horizontal component so that lowering the intermediate grain pan results in rearward movement of the intermediate grain pan, such that a proportionately greater first fall step results in a more rearward location of the intermediate grain pan.

10. The agricultural harvester of claim 4, wherein the main grain pan and the intermediate grain pan are configured to move in a reciprocal motion in order to impart rearward motion to the mixture of grain and residual MOG, the reciprocal motion of the main grain pan and the reciprocal motion of the intermediate grain pan being one of in phase and out of phase.

11. The agricultural harvester of claim 1, wherein the at least two grain pans and the at least one sieve are configured to move in a reciprocal motion in order to impart rearward motion to the mixture of grain and residual MOG, the reciprocal motion of the at least two grain pans and the reciprocal motion of the at least one sieve being one of in phase and out of phase.

12. The agricultural harvester of claim 1, wherein the at least two grain pans and the at least one sieve are configured to move in a reciprocal motion in order to impart rearward motion to the mixture of grain and residual MOG, a phase relationship between the reciprocal motion of each of the at least two grain pans and the at least one sieve being adjustable by an operator to accommodate properties of differing harvested products.

13. The agricultural harvester of claim 1, wherein the at least two grain pans and the at least one sieve are configured to move in a reciprocal motion in order to impart rearward motion to the mixture of grain and residual MOG, a magnitude of the reciprocal motion of the at least two grain pans being proportionately lesser than a magnitude of the reciprocal motion of the at least one sieve.

14. The agricultural harvester of claim 1, wherein the at least two grain pans and the at least one sieve are configured to move in a reciprocal motion in order to impart rearward motion to the mixture of grain and residual MOG, a proportionate magnitude of the reciprocal motion of each of the at least two grain pans and the at least one sieve being individually adjustable by an operator to accommodate properties of differing harvested products.

15. The agricultural harvester of claim 1, wherein the at least one sieve further comprises a pre-cleaning sieve, a chaffer sieve, and a shoe sieve.

16. A grain cleaning system for separating grain from residual MOG, the grain cleaning system comprising:
at least two grain pans for receiving a mixture of grain and residual MOG from a threshing and separating system;
at least one sieve for separating grain, tailings, and residual MOG located beneath and rearward of the at least two grain pans, the at least two grain pans and the at least one sieve being so arranged that, when in use, the mixture of grain and residual MOG undergoes at least two fall steps;
a grain transfer pan located beneath the at least two grain pans; and
a cleaning fan configured for blowing air into and through the mixture of grain and residual MOG as it undergoes the at least two fall steps and as it moves over the at least one sieve, the cleaning fan comprising a fan wrapper terminating in a wrapper cut-off point, the cleaning fan further comprising a fan outlet air guide terminating in a vortex cut-off point, the fan wrapper and the fan outlet air guide together defining a fan main outlet leading to at least one additional fan outlet, the wrapper cut-off point and the vortex cut-off point together defining a fan inlet, the wrapper cut-off point being located at an angle $\alpha$ counterclockwise from a vertical centerline through a center of the cleaning fan, the vortex cut-off point being located at an angle $\beta$ clockwise from the vertical centerline through the center of the cleaning fan, the angle $\alpha$ being between 40° and 70°, and the angle $\beta$ being between 30° and 60°.

17. The grain cleaning system of claim 16, wherein the angle $\alpha$ is between 50° and 60° and the angle $\beta$ is between 40° and 50°.

18. The grain cleaning system of claim 17, wherein the angle $\alpha$ is about 55° and the angle $\beta$ is about 45°.

19. The grain cleaning system of claim 16, wherein:
the at least two grain pans further comprise a main grain pan for receiving the mixture of grain and residual MOG from the threshing and separating system, and an intermediate grain pan located beneath and rearward of the main grain pan, and
the main grain pan, the intermediate grain pan, and the at least one sieve are so arranged that, when in use, the mixture of grain and residual MOG undergoes a first fall step from the main grain pan to the intermediate grain pan, and then undergoes a second fall step from the intermediate grain pan to the at least one sieve.

20. The agricultural harvester of claim 19, wherein the at least one additional fan outlet further comprises:
a fan upper outlet located between the main grain pan and the intermediate grain pan in the area of the first fall step;
a fan middle outlet located between the intermediate grain pan and the at least one sieve in the area of the second fall step; and
a fan lower outlet located beneath the grain transfer pan.

* * * * *